May 8, 1951  G. R. EUSNER  2,552,090
METHOD AND APPARATUS FOR MOLDING CERAMIC ARTICLES
Filed May 4, 1945
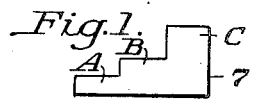
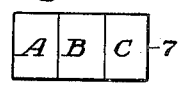
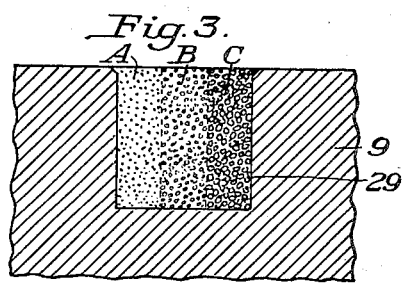
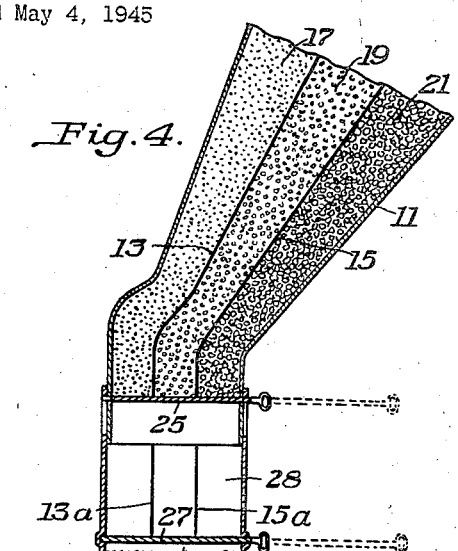
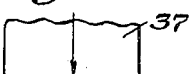
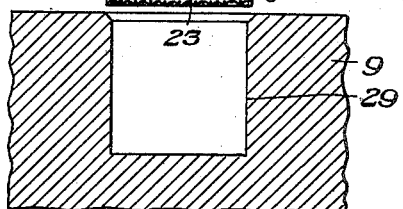
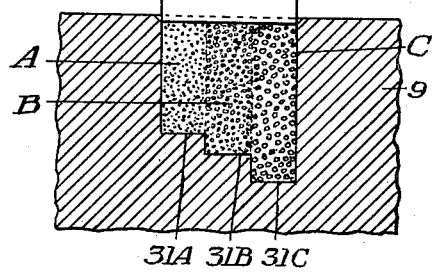
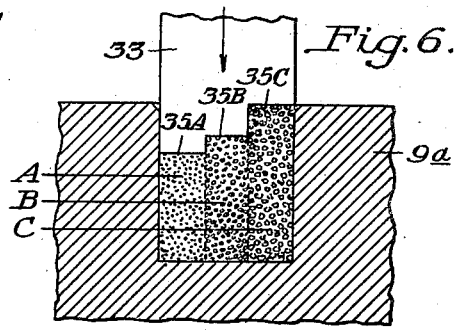
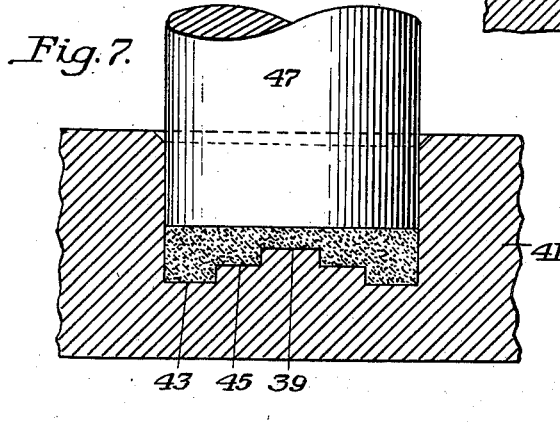
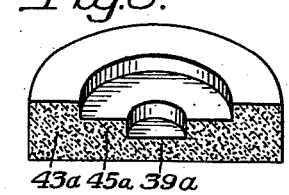
INVENTOR
George R. Eusner
by his attorneys Patented May 8, 1951

2,552,090

UNITED STATES PATENT OFFICE 2,552,090

METHOD AND APPARATUS FOR MOLDING CERAMIC ARTICLES

George R. Eusner, Latrobe, Pa., assignor to Stupakoff Ceramic & Manufacturing Company, Latrobe, Pa., a corporation of Pennsylvania Application May 4, 1945, Serial No. 591,901

3 Claims. (Cl. 25—103)

In accordance with the present invention, there are provided certain improvements in the molding of ceramic shapes of complicated shapes from ceramic compositions which do not possess good flow characteristics in the mold.

More particularly, the invention pertains to the molding of electrical insulating articles of varying thickness from such ceramic compositions which do not possess good flow characteristics in the mold or die. For example, insulator pieces made from titanium dioxide may have sections of varying thickness; and the uniform compaction of the titanium dioxide material in the die cannot ordinarily be secured because the material will not flow.

In accordance with the present invention, the mold or die cavity is filled with material of a bulk density. The portion of the die in which the thickest section is to be formed is filled with coarse material (material of highest bulk density). The portion of the die which produces an intermediate thickness is filled with finer material of intermediate bulk density, while the part of the die cavity in which the thinnest section is produced is filled with fine material of lower or lowest bulk density depending on thickness. When the resulting composite material is compacted, the finest portion, that is, the material of the least bulk density will compress or compact much more than the material of maximum bulk density. Hence, the necessary variation in thickness is obtained and the finished article possesses uniform density characteristics. Thus, the various thicknesses of a given pressed piece with uniform density can be controlled by the bulk density of the material. The bulk density of the material may be varied over a wide range—first, by particle size selection; and second, prepressed material broken up into its various particle sizes.

The invention will be understood more readily from the accompanying drawings, wherein Figure 1 is a side elevation of a ceramic article made in accordance with the present invention;

Figure 2 is a plan view of the article of Figure 1;

Figure 3 is a sectional elevation of a mold prepared in accordance with the present invention for molding the article of Figure 1;

Figure 4 is a sectional elevation of an apparatus for preparing the mold of Figure 3;

Figure 5 is a sectional elevation of one form of apparatus employed for making the article of Figure 1;

Figure 6 is a modified apparatus for preparing the article of Figure 1;

Figure 7 is a sectional elevation of a still further modified form of mold for forming a circular dielectric element composed of sections or shapes of different thickness, the view showing the molding piston in molding engagement with ceramic material in the mold; and Figure 8 is a perspective half-section of an article molded as shown in Figure 7.

It may be said that the present invention relates to the production of molded ceramic articles of irregular shape and thickness that are primarily intended for electrical insulation, wherein the body of the molded article before being pressed is composed of different sizes of particles of the ceramic material in the portions of different thickness and of different bulk densities before pressing. Specifically, the shapes formed in accordance with the present invention are of increasing thickness from one side to the opposite side, and more specifically, they are of substantially stepped shape in longitudinal cross section although not necessarily limited specifically to such a relation of the stepped portions.

Referring to the drawings and particularly to Figures 1, 2 and 3, there is shown, in Figures 1 and 2, one embodiment of the invention which comprises a molded ceramic article of stepped thickness, which article is adapted to be used for insulating purposes and which is composed of a material which does not possess good flow characteristics in the mold. The articles, such as shown in Figures 1 and 2 have sections of different thickness, wherein, where if a particle of uniform size throughout is used in accordance with current and conventional practice compaction of the material in the mold is not obtainable because the material will not flow or has limited flow, so as to give uniform pressure and densities in parts of different thickness. Consequently, in order to obtain a product of substantially uniform characteristics, such as density of the finished pressed article materials of different particle sizes are employed, the thinnest section being made up of the smallest particle sizes, the next thicker section being made up of a next larger particle size, and the still next thicker section being made up of still larger particle sizes.

As is shown in Figures 1 and 2, an article 7 of the above-indicated characteritics is made up of a relatively thin outer section A, which may be for example of the order of ⅛ inch, an intermediate or second section B of a somewhat greater thickness, say for example ¼ inch in thickness, and an inner or third section C, which is the thickest section, and which may be of the order of ½ inch in thickness, for example. This order of varying thicknesses is illustrative only, as are the respective values which are indicated above.

The sections of different thicknesses are produced in the molding of the article and are made up, as indicated above, of particles of increasing size as the thickness of the sections increases. The use of different sizes of particles assures substantially uniform compression and resulting densities in portions of different thickness throughout the units. The different sizes of particles produces a substantially uniform amount of motion of the particles of material in the respective sections under molding pressure as the thickness of the sections increases, thereby producing uniformity of compression of the material throughout the articles and enhancing uniformity of density through the various sections of the article.

The articles are molded from the titanium or other ceramic material in selected degrees of comminution by placing the said material in a mold, indicated diagrammatically at 9 in Figures 4 and 5, and 9a in Figure 6. The different particle sizes of the material are introduced into the mold in predetermined zones corresponding to the thickness of the respective sections of the molded article. Thus, in Figure 3, zone A in the mold contains the finest of the sizes of material, and makes section A of the molded article of Figures 1 and 2. Zone B contains the next larger material and makes section B of the molded article, which is thicker than section A in the drawings, but less thick than section C of the molded article, which, in the illustrated embodiment is the thickest section of the article and which is made from zone C of Figure 3.

Figure 4 represents an apparatus for filling the mold with the graded dimensions of materials maintained in distinct zones as indicated in Figure 3. This apparatus comprises a hollow holder 11, which conveniently is bent at an angle somewhat as is illustrated for convenience in filling. The holder 11 is divided interiorly by partitions 13 and 15 which form compartments 17, 19 and 21, corresponding respectively to zones A, B and C. Thus the finest material is placed into compartment 17, the next coarser in compartment 19, and the coarsest in compartment 21.

The outlet end 23 of the holder 11 is of the same size and shape of the mold 9, the materials in the compartments flowing by gravity simultaneously from the holder 11 into the mold 9 to fill the mold with the distinct zones A, B, and C of Figure 3.

Control of the discharge of the materials from the compartments 17, 19 and 21 is effected by sliding plates 25, and 27, positioned near the discharge end of holder 11. Plate 25 is the upper plate and is spaced upwardly from plate 27, each plate closing the inner space of the holder 11, and defining between them a material receiving compartment 28 of substantially the same volume as has the mold cavity 9. Partitions 13a and 15a may be provided for the material receiving compartment 28, between the slides 25 and 27, in order to keep the materials of the different particle size in their proper respective zones, in proper amount and without undue intermingling or mixing with adjacent zones. Independent control of the amount of materials flowing from zones 17, 19 and 21 to the receiving compartment 28 may be provided to vary the same if needed, in accordance with the varying thicknesses of the molded part, and the bulk densities of the zones of material of different particle size.

The discharge end 23 is placed over the mold, and is indicated in Figure 4, and the plate 25 is withdrawn, thereby allowing the variously sized material from compartments 17, 19 21 to fill the compartment 28 in assorted relation. Plate 25 then is closed, thereby shutting off in the compartment 28 just enough of the sized material as will fill the mold cavity 29. When the slide 27 is opened, the material still in its assorted selected sizes will pass on into the mold cavity 29, filling the mold with the materials still maintained in selected proper order of selected sizes for filling the mold with the zones A, B, and C.

For molding the articles into the desired shape from zones A, B, and C, the bottom of the mold may be stepped as indicated in Fig. 5 at 31A, 31B, 31C, for molding the zones A, B, and C of the material in the mold into the sections A, B, and C of the molded article as shown in Figs. 1 and 2 which sections have graduated thicknesses as has been indicated above; or as shown in Figure 6, the bottom surface of the molding plunger or piston 33 may be stepped as indicated at 35A, 35B, and 35C for action on the zones A, B, and C of the material in the mold to form the sections A, B, and C of the finished molded article.

As is indicated on the drawings, the material in the zones A, B, and C, is molded into the sections A, B, and C of the molded article, by means of a piston 33 (Fig. 6) or 37 (Fig. 5) molding pressure being applied in any suitable manner (for instance, hydraulically) on the pistons. The material in the zones A, B, and C, is compressed uniformly by the molding pressure into the corresponding sections A, B, and C of the molded article, by engagement with the stepped mold surface or the stepped end of the molding piston.

After molding, the resulting article having the sections A, B, and C of graduated thickness, is removed from the mold, and fired in the usual manner.

Reference now may be had, specifically to Figures 7 and 8.

In Figure 7, the ceramic material is zoned so that the finest material is in the central portion of the mold above the thickest of highest stage 39 of a mold 41 (corresponding to the thinnest portion of the molded pressed article), the coarsest material being above the lowest stage 43 of the mold (corresponding to the thickest portion of the molded pressed article), intermediate sized particles of the ceramic material being above the intermediate stage 45 of the mold. It will be seen that in this instance, the mold cavity is round in horizontal cross section, and the stages 43, 45 and 39 are concentrically disposed one on another, having decreasing diameters as the thickness of the stages of the press molded pieces, decreases.

The piston 47 is shown in Figure 7 to be in molding engagement with the zoned ceramic material in the mold cavity. There results, therefore, a final dielectric shape shown in half section of Figure 8, wherein the shape is built up of successive concentric rings of zones, the thinnest being the zone 39a, which contains the finest particles of ceramic material, the intermediate zone 45a, composed of intermediate sizes of ceramic material and the outer zone 43a, which is the thickest zone, and is composed of coarsest ceramic material. These zones 39a, 45a and 43a are formed by compression of the correspondingly zoned material against the mold stages 39, 45, and 43, respectively, as will be apparent from the drawings.

It may be said that the invention comprises the making of molded ceramic dielectric elements having sections of different thickness from ceramic material of varying bulk density or varying degrees of coarseness (or fineness), of particle size, the thickness of the respective sections corresponding to the different particle sizes of materials disposed in the respective sections, ranging from finest to coarsest particle size as the sections range from the thinnest to the thickest in vertical cross-section.

I claim:

1. Apparatus for molding ceramic articles composed of a plurality of sections of different thickness, which comprises in combination a mold for receiving ceramic material to be molded, means for simultaneously introducing the ceramic material into the mold in distinct zones corresponding to differences in degrees of coarseness of the material, the said degrees of coarseness corresponding to difference in thickness of the sections in the final shape, and means for pressure-molding the zoned material in the mold against a molding surface of stepped configuration for pressing the said sections into the article during final molding of the article, so that finest particles compose the thinnest section of the final article, the next coarser particles compose the next thicker section, and so on, until the coarsest particles compose the thickest section.

2. The process of compression molding a ceramic article having parts of unequal thickness which comprises segregating ceramic particles of different sizes into adjacent zones in which respectively the particles have a substantially uniform size selected in accordance with the thickness of the part to be formed therefrom, and then effecting different percentage volumetric changes of the material in said zones in accordance with the size of the ceramic particles in said zones by the application of a molding pressure thereto to form said parts of unequal thickness.

3. Apparatus for producing ceramic articles composed of a plurality of sections of different thickness, which comprises in combination a mold for receiving ceramic material to be molded, means for simultaneously introducing the ceramic material into the mold in distinct zones corresponding to differences in degrees of coarseness of the material, the said degrees of coarseness corresponding to difference in thickness of the sections in the final shape, said means comprising a hollow casing partitioned interiorly into compartments corresponding to said zones for receiving the ceramic material of different degrees of coarseness, said compartments having discharge openings adjacent the mold and means for discharging the material therefrom into the mold with the materials of different degrees of coarseness respectively in the different zones of said mold, and means for pressure-molding the zoned material in the mold against a molding surface of stepped configuration for pressing the said sections into the article during final molding of the article, so that finest particles compose the thinnest section of the final article, the next coarser particles compose the next thicker section, and so on, until the coarsest particles compose the thickest section.

GEORGE R. EUSNER.

REFERENCES CITED

The following references are of record in the file of this patent:

UNITED STATES PATENTS

| Number | Name | Date |
|---|---|---|
| 124,200 | Farmer | Mar. 5, 1872 |
| 682,243 | Cuscaden | Sept. 10, 1901 |
| 1,247,213 | Brinkman | Nov. 20, 1917 |
| 1,268,226 | Flood | June 4, 1918 |
| 1,472,399 | Pettengill | Oct. 30, 1923 |
| 1,541,357 | Johnson | June 9, 1925 |
| 1,652,884 | Ackermann | Dec. 13, 1927 |
| 1,799,928 | Phifer | Apr. 7, 1931 |
| 1,839,324 | Markle | Jan. 5, 1932 |
| 2,208,054 | Reed | July 16, 1940 |
| 2,301,939 | Fischer | Nov. 17, 1942 |
| 2,326,381 | Milligan et al. | Aug. 10, 1943 |

FOREIGN PATENTS

| Number | Country | Date |
|---|---|---|
| 326,150 | Italy | May 1, 1935 |